US012774161B2

(12) United States Patent
Chang et al.

(10) Patent No.: US 12,774,161 B2
(45) Date of Patent: Oct. 27, 2026

(54) SYSTEM AND METHOD FOR PUBLIC AND PRIVATE WAREHOUSES MANAGEMENT WITH AUTOMATED EQUIPMENT

(71) Applicant: ALLY LOGISTIC PROPERTY CO., LTD., Taipei City (TW)

(72) Inventors: Chien-Tai Chang, Taipei City (TW); Pei-Chia Liu, Taipei City (TW); Meng-Harn Lin, Taipei City (TW); Kai-Lun Lin, Taipei City (TW); Yu-Chen Kuo, Taipei City (TW)

(73) Assignee: ALLY LOGISTIC PROPERTY CO., LTD., Taipei City (TW)

( * ) Notice: Subject to any disclaimer, the term of this patent is extended or adjusted under 35 U.S.C. 154(b) by 331 days.

(21) Appl. No.: 18/738,332

(22) Filed: Jun. 10, 2024

(65) Prior Publication Data

US 2024/0417169 A1 Dec. 19, 2024

(30) Foreign Application Priority Data

Jun. 13, 2023 (TW) ................................ 112122063

(51) Int. Cl.
*B65G 1/04* (2006.01)
*G06Q 10/08* (2024.01)

(52) U.S. Cl.
CPC ........... *B65G 1/0485* (2013.01); *G06Q 10/08* (2013.01); *B65G 1/0492* (2013.01); *B65G 2203/0241* (2013.01); *B65G 2203/0258* (2013.01)

(58) Field of Classification Search
CPC .... G06Q 10/08; B65G 1/0485; B65G 1/0492; B65G 2203/0241; B65G 2203/0258; B65G 1/065; B65G 1/1378
See application file for complete search history.

(56) References Cited

U.S. PATENT DOCUMENTS

| | | | | |
|---|---|---|---|---|
| 8,972,045 B1 * | 3/2015 | Mountz | B65G 1/1373 | 700/229 |
| 2016/0129592 A1 * | 5/2016 | Saboo | B25J 15/0625 | 700/248 |
| 2023/0095494 A1 * | 3/2023 | Simpson | B65G 1/1378 | 700/216 |

* cited by examiner

*Primary Examiner* — Timothy R Waggoner
(74) *Attorney, Agent, or Firm* — MUNCY, GEISSLER, OLDS & LOWE, P.C.

(57) ABSTRACT

A system for public and private warehouses management with automated equipment includes a public warehouse having multiple floors and an outer perimeter; an automated guided vehicle operation area located in the outer perimeter of the public warehouse; a transfer station space located out of each side of the public warehouse; an automated guided vehicle space adjacent to one side of the transfer station space away from the public warehouse; a maintenance station space arranged at a predetermined location adjacent to the automated guided vehicle space; an inbound/outbound space adjacent to one side of the automated guided vehicle space away from the public warehouse; and two private warehouses connected with the inbound/outbound space. Each of the private warehouses has multiple floors corresponding to the floors of the public warehouse.

5 Claims, 5 Drawing Sheets

SYSTEM AND METHOD FOR PUBLIC AND PRIVATE WAREHOUSES MANAGEMENT WITH AUTOMATED EQUIPMENT

BACKGROUND OF THE INVENTION

1. Field of the Invention

The present invention relates to technology for warehouse management, and more particularly, to a system and method for public and private warehouses management with automated equipment.

2. Description of the Related Art

With the advancement and innovation of technology, the acceptance and use of online shopping have been gradually increasing. Traditional logistics solutions are no longer capable of easily coping with the variability caused by the growth of logistics demand. The difficulty of inventory management within warehouses gradually increase along with the variability of logistics goods. The uncertainty in estimating the spatial requirements for commodity inventory brings risks to the decisions in the logistics industry. In the past, additional costs were required to address the issues of variation in inventory demand during peak and off seasons. In peak seasons, efforts were made to alleviate inventory pressure during periods of high market demand, while in off seasons, the costs associated with reducing idle inventory space needed to be minimized, so as to adapt to the changes in market demand.

SUMMARY OF THE INVENTION

The present invention aims at providing system and method for public and private warehouses management with automated equipment, so as to offer a more flexible warehouse leasing scheme. Clients only need to pay rental fees for the to-be-utilized warehouse space, thereby saving on equipment investments in land purchase and warehouse construction. If different clients have upstream or downstream relationships therebetween, the demand for products distribution is fulfilled by simply moving the storage units in the warehouse, thereby significantly reducing the length of the supply chain between different clients.

Also, considering the assignment of storage units for goods with mutually exclusive attributes under distance constraints, an algorithm is applied to avoid mutual interference between goods of different clients.

A customizable warehouse execution system is developed, so as to be directly connected with the warehouse management system currently used by the client, thereby enabling the real-time access to inventory information and status through the software.

For achieving the aforementioned objectives, the present invention provides a method for public and private warehouses management with automated equipment, comprising an inbound process and an outbound process, wherein the inbound process comprises following steps: a1: sending a store task requirement through a warehouse management system of a private warehouse, and issuing a store task through a warehouse execution system of a public warehouse; a2: a goods transporting equipment of the private warehouse moving a to-be-stored pallet to an inbound port of an automated guided vehicle operation area; a3: conducting an inbound inspection operation according to an inspection regulation; a4: an automated guided vehicle in the automated guided vehicle operation area moving to the inbound port to transport the to-be-stored pallet; a5: the automated guided vehicle which transports the to-be-stored pallet arriving a transfer station space of where it is to be stored in the automated guided vehicle operation area; a6: a goods transporting equipment of the public warehouse moving to the transfer station space of where the to-be-stored pallet is to be stored to pick up the to-be-stored pallet; a7: the goods transporting equipment of the public warehouse moving the to-be-stored pallet to a designated to-be-stored storage area; and a8: completing the store task of the pallet. The outbound process comprises following steps: b1: sending a retrieval task requirement through the warehouse management system of the private warehouse, and issuing a retrieval task through the warehouse execution system of the public warehouse; b2: the goods transporting equipment of the public warehouse moving to a designated to-be-retrieved storage area to pick up a to-be-retrieved pallet; b3: the goods transporting equipment of the public warehouse moving the to-be-retrieved pallet to a transfer station space for retrieval in the automated guided vehicle operation area; b4: the automated guided vehicle in the automated guided vehicle operation area transferring the to-be-retrieved pallet to an outbound port of the automated guided vehicle operation area corresponding to a client; b5: the client moving the to-be-retrieved pallet to a private warehouse according to a screen display; and b6: completing the retrieval task of the pallet.

In an embodiment, the inbound inspection operation comprises checking the volume, weight, and pallet number.

In an embodiment, when the result of the inbound inspection operation fails to meet the regulations, a re-inspection will be conducted. If the inspection result meets the regulations, the process proceeds to the next step, so as to prevent the interference between the goods from different clients.

The present invention further provides a public and private warehouses management with automated equipment, comprising: a public warehouse having multiple floors and an outer perimeter; and an automated guided vehicle operation area disposed in the outer perimeter of the public warehouse; the automated guided vehicle operation area comprising: a transfer station space located out of each side of the public warehouse; an automated guided vehicle space located out of each side of the public warehouse and adjacent to one side of the transfer station space away from the public warehouse; a maintenance station space located out of each side of the public warehouse and arranged at a predetermined location adjacent to the automated guided vehicle space; and an inbound/outbound space located out of each side of the public warehouse and adjacent to one side of the automated guided vehicle space away from the public warehouse; and a private warehouse connected with the inbound/outbound space of the automated guided vehicle operation area, wherein the private warehouse has multiple floors corresponding to the floors of the public warehouse, respectively.

In an embodiment, the public warehouse comprises a plurality of storage areas. Each storage area comprises multiple storage unit groups, and is allowed to be defined through the system with the attributes of goods to be placed corresponding to different storage areas as well as the mutually exclusive relationships between different attributes.

In an embodiment, the public warehouse comprises an automated storage system and a stacking machine.

In an embodiment, the inbound/outbound space comprises a plurality of inbound ports and a plurality of outbound ports that are disposed corresponding to each floors of the private warehouse and the public warehouse.

In an embodiment, the inbound/outbound space comprises an inbound storing detection operation station.

In an embodiment, the inbound/outbound space comprises an outbound retrieving detection operation station.

DETAILED DESCRIPTION OF THE INVENTION

The aforementioned and further advantages and features of the present invention will be understood by reference to the description of the preferred embodiment in conjunction with the accompanying drawings.

Figure 1:
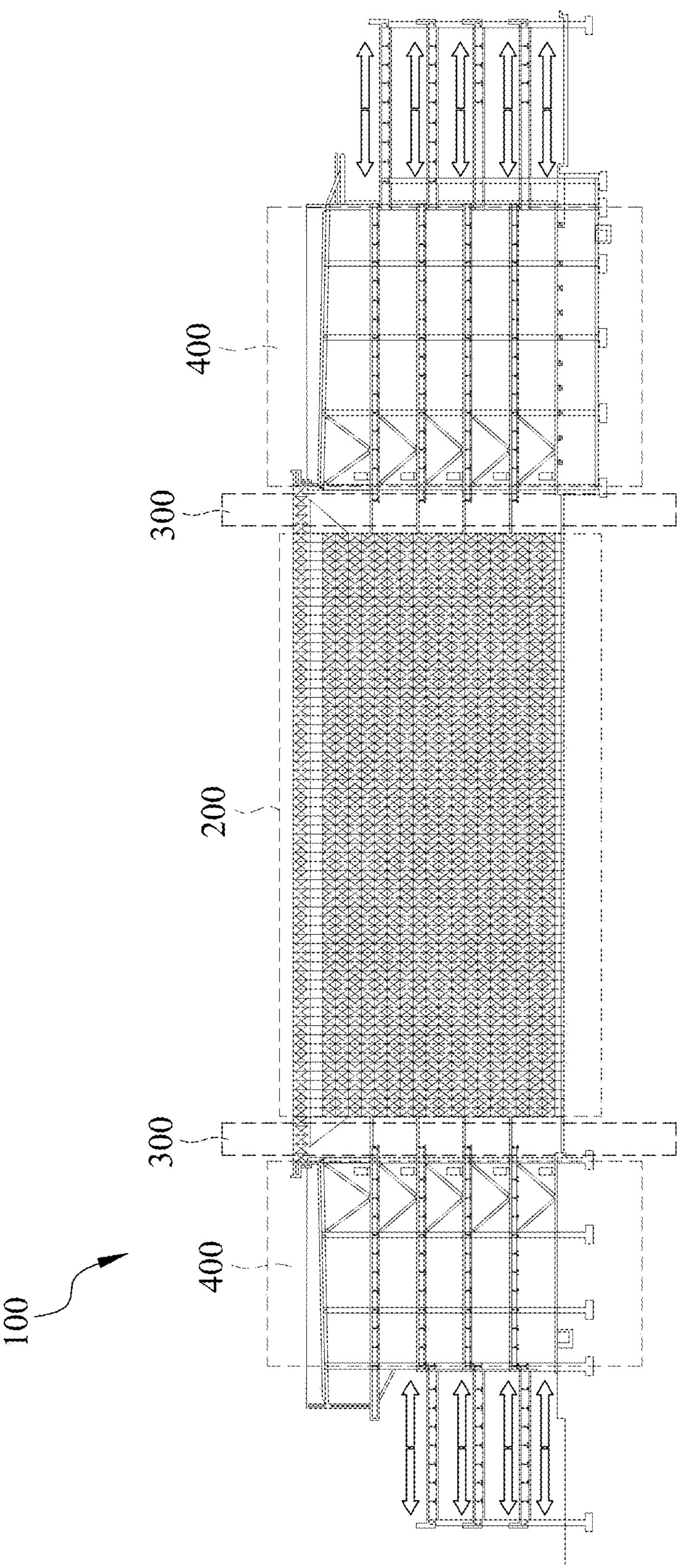
FIG. 1 is a schematic view of the system for public and private warehouses management with automated equipment in accordance with an embodiment of the present invention.
Figure 2:
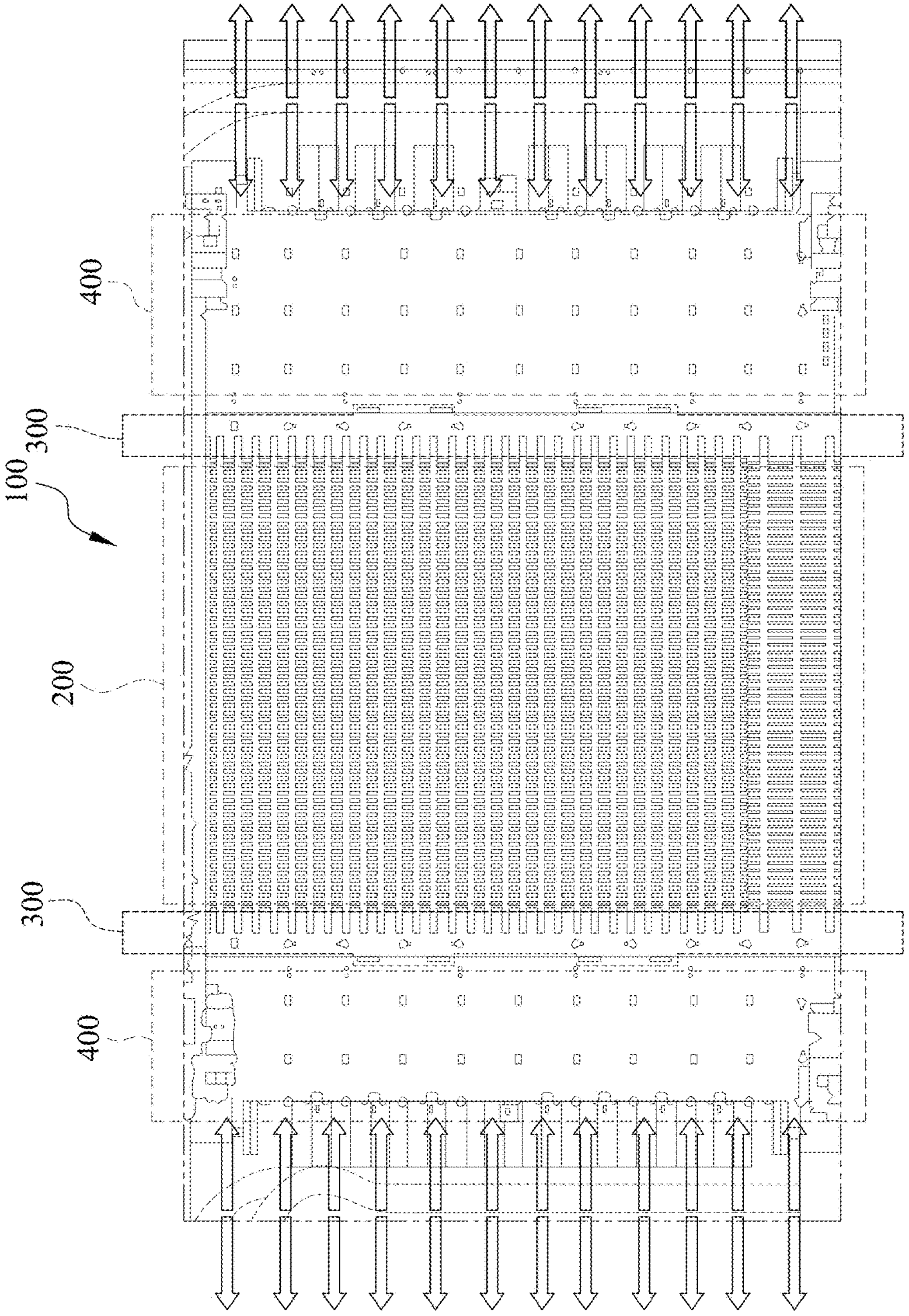
FIG. 2 is a brief schematic view of the system for public and private warehouses management with automated equipment in accordance with an embodiment of the present invention.
Figure 3:
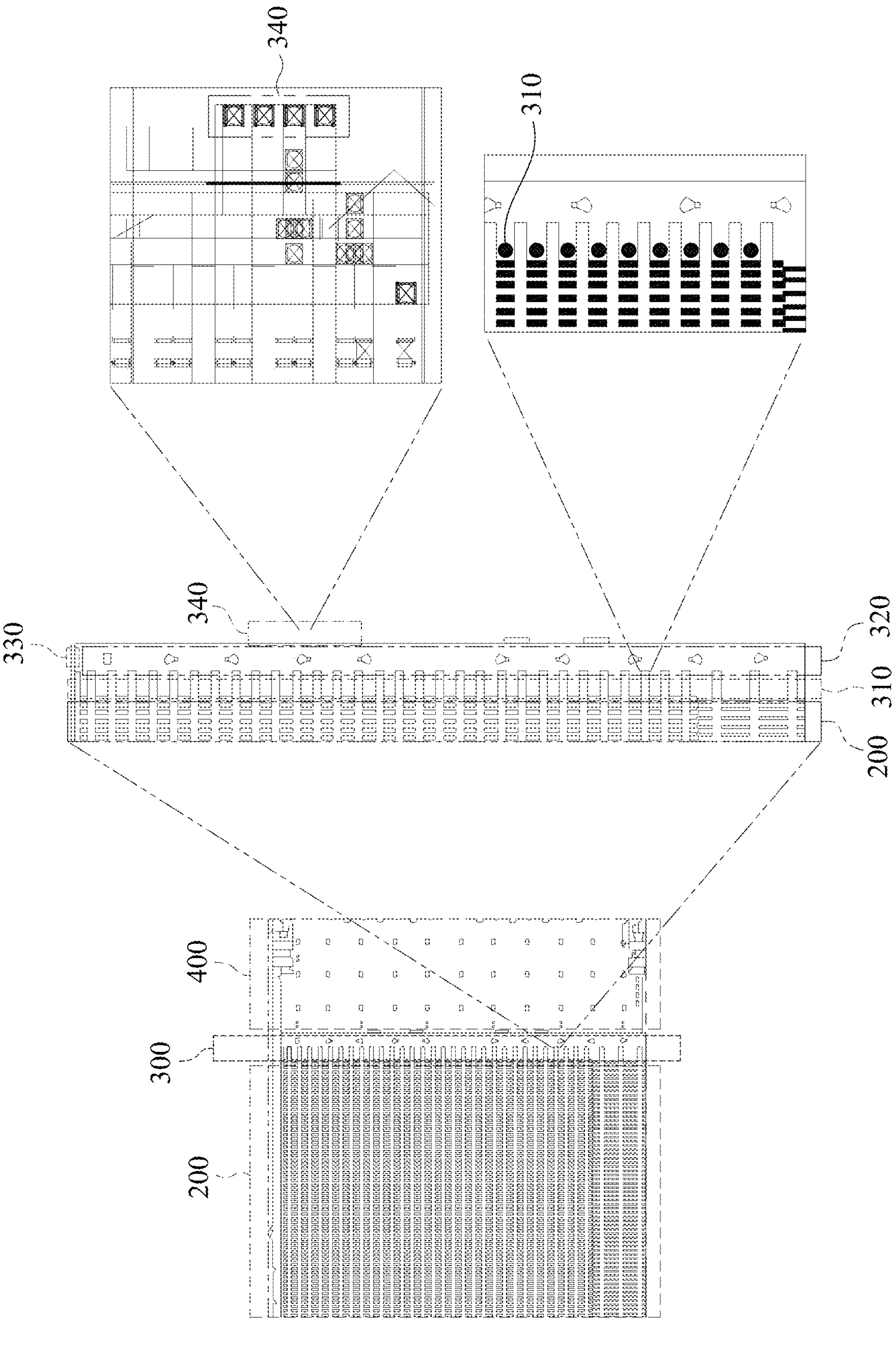
FIG. 3 is a partially enlarged schematic view of the system for public and private warehouses management with automated equipment in accordance with an embodiment of the present invention.

FIG. 1 is a schematic view of the system for public and private warehouses management with automated equipment in accordance with an embodiment of the present invention. FIG. 2 is a brief schematic view of the system for public and private warehouses management with automated equipment in accordance with an embodiment of the present invention. FIG. 3 is a partially enlarged schematic view of the system for public and private warehouses management with automated equipment in accordance with an embodiment of the present invention.

Referring to FIG. 1 to FIG. 3, the present invention provides a system 100 for public and private warehouses management with automated equipment, comprising a public warehouse 200, an automated guided vehicle operation area 300, and a private warehouse 400. In an embodiment, the public warehouse 200, referred to as the "inner field", operates without manual intervention and is fully managed by automated equipment, such as a well-known automated storage and retrieval system (AS/RS). The private warehouse 400, referred to as the "outer field", is to be used by clients or companies renting it. The public warehouse 200 may, for example but not limited to, have multiple floors and at least one outer perimeter, such as a eastern or western side. The private warehouse 400 and the public warehouse 200 simultaneously have corresponding multiple floors and an outer perimeter. The automated guided vehicle operation area 300 is connected to or located in the outer perimeter of the public warehouse 200, and the private warehouse 400 is connected to or located on one side of the corresponding automated guided vehicle operation area 300 away from the public warehouse 200. In other words, the automated guided vehicle operation area 300 is located between the public warehouse 200 and the private warehouse 400. In an embodiment, the public warehouse 200 comprises an automated storage and retrieval system and a stacking machine (not shown).

Referring to FIG. 1 to FIG. 3, the automated guided vehicle operation area 300 is located on each side of the public warehouse 200 and arranged between the public warehouse 200 and the private warehouse 400. The automated guided vehicle operation area 300 comprises a transfer station space 310, an automated guided vehicle (AGV) space 320, a maintenance station space 330, and an inbound/outbound space 340.

The transfer station space 310 is located out of each side of the public warehouse 200 and in adjacent to the public warehouse 200. Therein, the transfer station space 310 is allowed to be a pallet or a transfer station of goods. The automated guided vehicle space 320 is located out of each side of the public warehouse 200 and in adjacent to one side of the transfer station space 310 away from the public warehouse 200. The maintenance station space 330 is located out of each side of the public warehouse 200 and arranged on top of the automated guided vehicle space 320. The location of the maintenance station space 330 is allowed to be varied according to actual usage demand. The inbound/outbound space 340 is located out of each side of the public warehouse 200 and in adjacent to one side of the automated guided vehicle space 320 away from the public warehouse 200.

In an embodiment, the inbound/outbound space 340 comprises a plurality of inbound ports and outbound ports that are disposed corresponding to each floor of the public warehouse 200 and the private warehouse 400. In other words, each side of each floor of the public warehouse 200 and the private warehouse 400 simultaneously has the inbound port and the outbound port. In an embodiment, the inbound port is the pallet delivering port, and the outbound port is the pallet receiving port.

Figure 4:
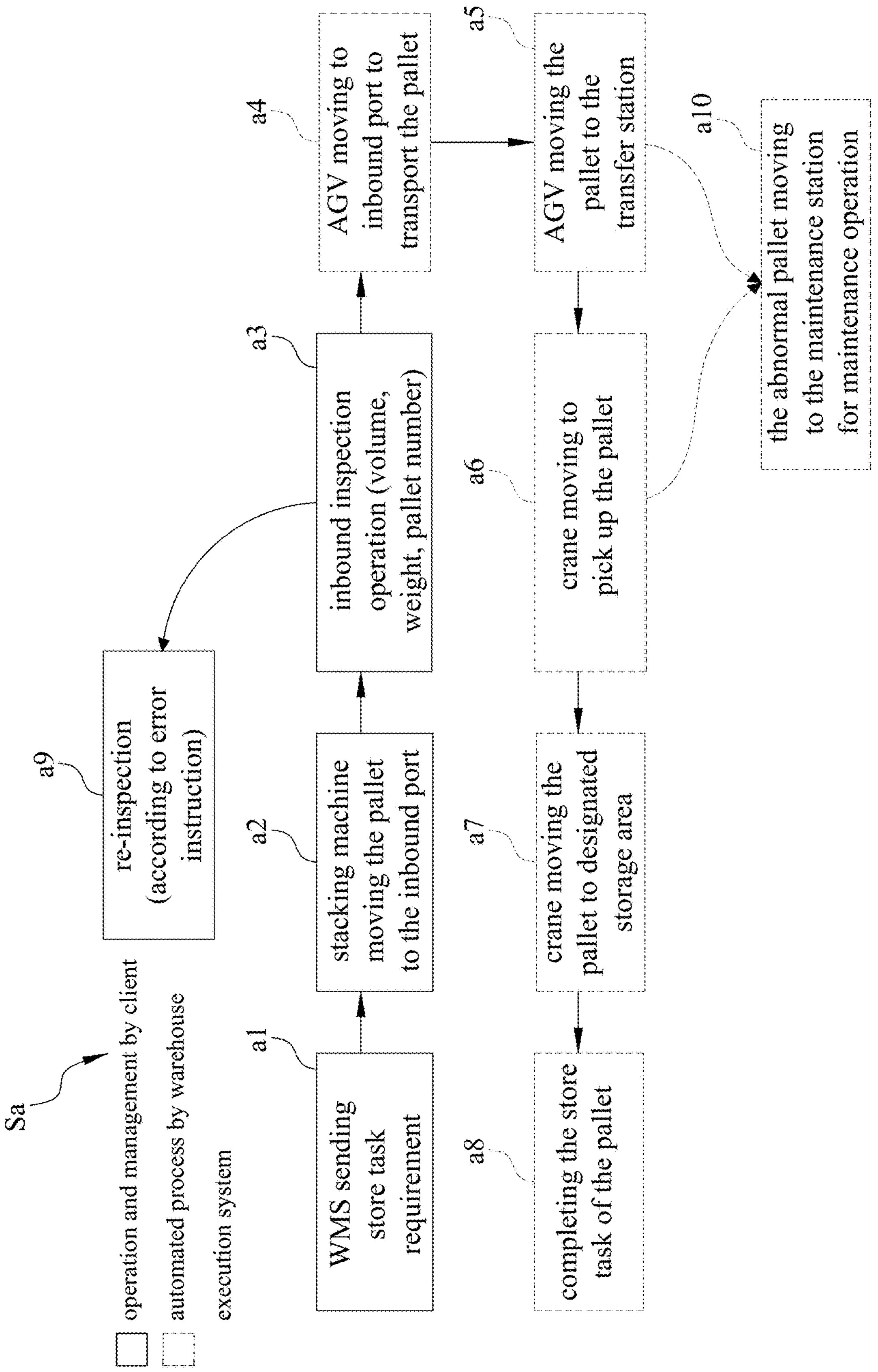
FIG. 4 is a flow chart of the inbound process of the method for public and private warehouses management with automated equipment in accordance with an embodiment of the present invention.
Figure 5:
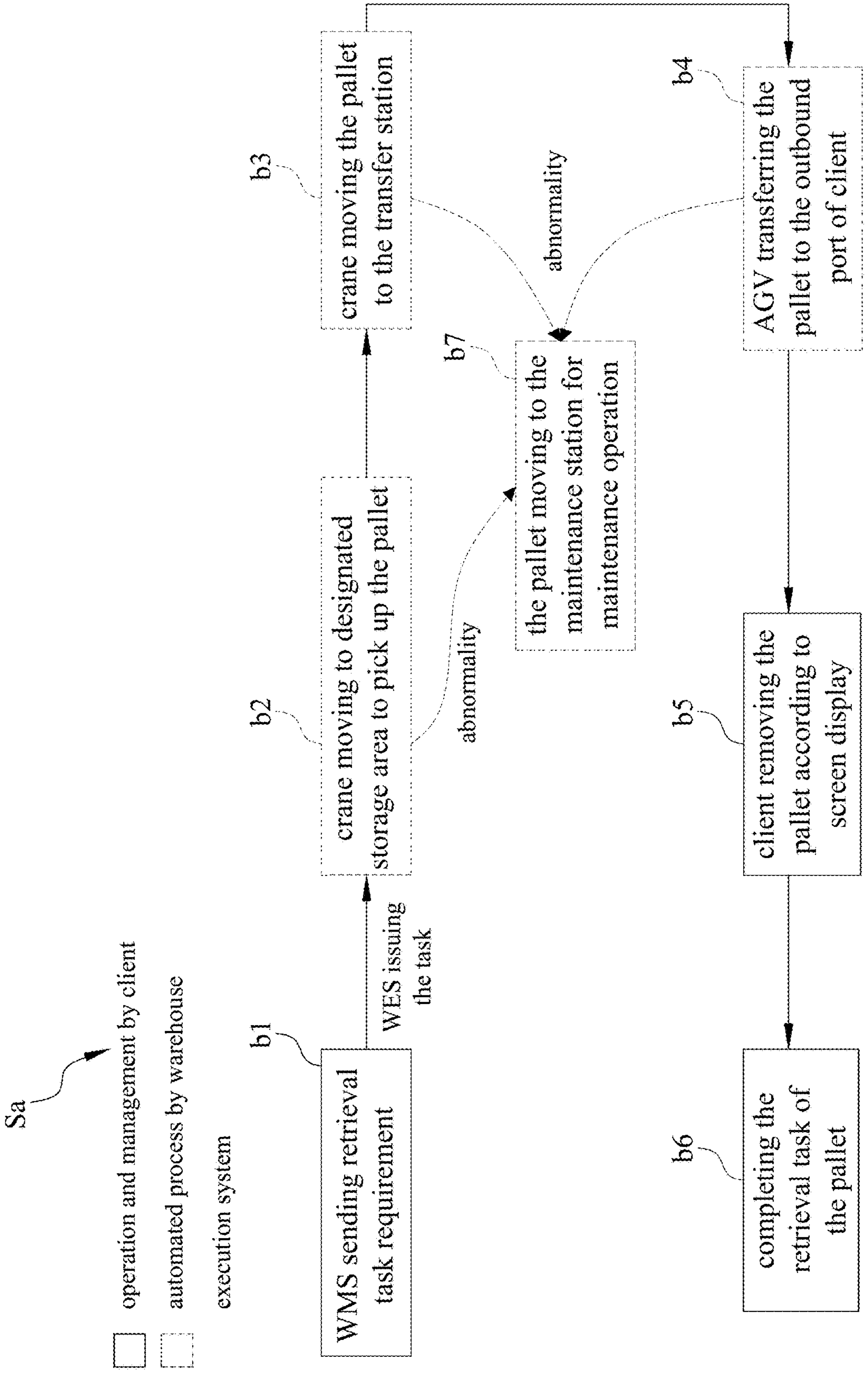
FIG. 5 is a flow chart of the outbound process of the method for public and private warehouses management with automated equipment in accordance with an embodiment of the present invention.

FIG. 4 is a flow chart of the inbound process of the method for public and private warehouses management with automated equipment in accordance with an embodiment of the present invention. FIG. 5 is a flow chart of the outbound process of the method for public and private warehouses management with automated equipment in accordance with an embodiment of the present invention. The method for public and private warehouses management with automated equipment provided by the present invention comprises an inbound process Sa and an outbound process Sb.

Referring to FIG. 4, the inbound process Sa comprises following steps: step a1: sending a store task requirement through a warehouse management system (WMS) of a private warehouse 400, and issuing a store task through a warehouse execution system (WES) developed by a public warehouse 200; step a2: a goods transporting equipment (such as a forklift) of the private warehouse 400 moving a to-be-stored pallet to an inbound port; step a3: conducting an inbound inspection operation according to an inspection regulation; step a4: an automated guided vehicle moving to the inbound port to transport the to-be-stored pallet; step a5: the automated guided vehicle which transports the to-be-stored pallet arriving a transfer station space 310 of where it is to be stored; step a6: a stacking machine (crane) or other goods transporting equipment of the public warehouse 200 moving to the transfer station space 310 of where it is to be stored to pick up the to-be-stored pallet; step a7: the stacking machine or other goods transporting equipment of the public warehouse 200 moving the to-be-stored pallet to a designated to-be-stored storage area (public warehouse 200); and step a8: completing the store task of the pallet. Said warehouse execution system (WES) is developed by the owner or the developer of the public warehouse and allowed to be improved according to usage demand.

The inbound inspection operation in step a3 comprises checking the volume, weight, and pallet number. When any result of the inbound inspection operation fails to meet the regulations, a re-inspection (step a9) will be conducted. If the inspection result meets the regulations, the process proceeds to the next step (step a4). In step a5, after the automated guided vehicle transporting the to-be-stored pallet arrives the transfer station space 310 of where it is to be stored, if the to-be-stored pallet has any abnormality, the abnormal to-be-stored pallet is transported to a maintenance station space 330 to be conducted with a maintenance operation (step a10); if the to-be-stored pallet has no abnormalities, the process proceeds to the next step (step a6). The steps a1 to a3 of the inbound process Sa are operated and managed by a client, and the steps a4 to a8 of the inbound process Sa are automatically carried out by a warehouse execution system developed and designed by the owner of the public warehouse 200.

Referring to FIG. 5, the outbound process Sb comprises following steps: step b1: sending a retrieval task requirement through the warehouse management system (WMS) of the private warehouse 400, and issuing a retrieval task through the warehouse execution system (WES) developed by the public warehouse 200; step b2: the stacking machine or other goods transporting equipment of the public warehouse 200 moving to a designated to-be-retrieved storage area to pick up a to-be-retrieved pallet; step b3: the stacking machine or other goods transporting equipment of the public warehouse 200 transporting the to-be-retrieved pallet to a transfer station space 310 for retrieval; step b4: the automated guided vehicle transferring the to-be-retrieved pallet to an outbound port of a private warehouse 400 corresponding to a client; step b5: the client removing the to-be-retrieved pallet according to a screen display; and step b6: completing the retrieval task of the pallet.

From step b2 to step b4 in the outbound process Sb, if the to-be-retrieved pallet has any abnormality, the abnormal to-be-retrieved pallet is transported to the maintenance station space 330 to be conducted with a maintenance operation (step b7); if the to-be-retrieved pallet has no abnormalities, the process proceeds to the next step (step b3, b4, b5), respectively. The steps b1, b5, and b6 of the outbound process Sb are operated and managed by a client, and the steps b2 to b4 of the outbound process Sb are automatically carried out by a warehouse execution system developed and designed by the owner of the public warehouse 200. In an embodiment, the designated to-be-stored storage area in the outbound process Sb is exclusively for client use.

With the structure and method above, a more flexible storage leasing scheme is provided, in which the clients only need to pay rental fees for the to-be-utilized warehouse space, thereby saving on equipment investments in land purchase and warehouse construction. If different clients have upstream or downstream relationships therebetween, the demand for products distribution is fulfilled by simply moving the storage units in the warehouse, thereby significantly reducing the length of the supply chain between different clients.

The warehouse execution system is allowed to be customized and directly connected with the current warehouse management system of the client, so that the inbound and outbound tasks are automatically carried out by use of the software at any time.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for public and private warehouses management with automated equipment, comprising an inbound process and an outbound process, wherein:

the inbound process comprises following steps:

a1: sending a store task requirement through a warehouse management system of a private warehouse, and issuing a store task through a warehouse execution system of a public warehouse;

a2: a goods transporting equipment of the private warehouse moving a to-be-stored pallet to an inbound port of an automated guided vehicle operation area;

a3: conducting an inbound inspection operation according to an inspection regulation;

a4: an automated guided vehicle in the automated guided vehicle operation area moving to the inbound port to transport the to-be-stored pallet;

a5: the automated guided vehicle which transports the to-be-stored pallet arriving a transfer station space of where it is to be stored in the automated guided vehicle operation area;

a6: a stacking machine or other goods transporting equipment of the public warehouse moving to the transfer station space of where the to-be-stored pallet is to be stored to pick up the to-be-stored pallet;

a7: the stacking machine or other goods transporting equipment of the public warehouse moving the to-be-stored pallet to a designated to-be-stored storage area; and a8: completing the store task of the pallet;

the outbound process comprises following steps:

b1: sending a retrieval task requirement through the warehouse management system of the private warehouse, and issuing a retrieval task through the warehouse execution system of the public warehouse;

b2: the stacking machine or other goods transporting equipment of the public warehouse moving to a designated to-be-retrieved storage area to pick up a to-be-retrieved pallet;

b3: the stacking machine or other goods transporting equipment of the public warehouse moving the to-be-retrieved pallet to a transfer station space for retrieval in the automated guided vehicle operation area;

b4: the automated guided vehicle in the automated guided vehicle operation area transferring the to-be-retrieved pallet to an outbound port of the automated guided vehicle operation area corresponding to a client;

b5: the client moving the to-be-retrieved pallet to a private warehouse according to a screen display; and b6: completing the retrieval task of the pallet.

2. The method for public and private warehouses management with automated equipment of claim 1, wherein the inbound inspection operation comprises checking a volume, weight, and pallet number of goods; when a result of the inbound inspection operation fails to meet a regulation, a re-inspection is then conducted; if inspection result meets the regulation, the method proceeds to the next step.

3. The method for public and private warehouses management with automated equipment of claim 1, wherein the step a1 to step a3 of the inbound process are operated and managed by a client, and the step a4 to step a8 of the inbound process are automatically carried out by the warehouse execution system.

4. A system for public and private warehouses management with automated equipment, comprising:

a public warehouse having multiple floors and an outer perimeter, sending a store task requirement or a retrieval task requirement through a warehouse management system of a private warehouse, and issuing a store task or a retrieval task through a warehouse management system of the public warehouse; and an automated guided vehicle operation area disposed in the outer perimeter of the public warehouse, an automated guided vehicle moving to the automated guided vehicle operation area to transport a to-be-stored pallet of transferring a to-be-retrieved pallet to the automated guided vehicle operation area corresponding to a client; the automated guided vehicle operation area comprising:

a transfer station space located out of each side of the public warehouse, the automated guided vehicle which transports the to-be-stored pallet arriving at the transfer station space or moving the to-be-retrieved pallet from the transfer station space, the to-be-stored pallet moving to a designated to-be-stored storage area or pick up the to-be-retrieved pallet from a designated to-be-retrieved storage area;

an automated guided vehicle space located out of each side of the public warehouse and adjacent to one side of the transfer station space away from the public warehouse;

a maintenance station space located out of each side of the public warehouse and arranged at a predetermined location adjacent to the automated guided vehicle space;

an inbound/outbound space located out of each side of the public warehouse and adjacent to one side of the automated guided vehicle space away from the public warehouse; and two private warehouses connected with the inbound/outbound space of the automated guided vehicle operation area, respectively, wherein each of the private warehouses has multiple floors disposed corresponding to the floors of the public warehouse, respectively.

5. The system for public and private warehouses management with automated equipment of claim 4, wherein the public warehouse comprises a plurality of storage areas; each of the storage areas comprises multiple storage unit groups; the public warehouse comprises an automated storage system and a stacking machine or other goods transporting equipment; the inbound/outbound space comprises a plurality of inbound ports and a plurality of outbound ports that are disposed corresponding to each of the floors of the private warehouse and the public warehouse, respectively.

* * * * *